3,202,515
STABILIZATION OF FOAM IN FERMENTED MALT BEVERAGES
Irwin M. Stone, Staten Island, N.Y., assignor to Baxter Laboratories, Inc., Morton Grove, Ill., a corporation of Delaware
No Drawing. Filed Jan. 10, 1962, Ser. No. 165,726
1 Claim. (Cl. 99—48)

This application is a continuation-in-part of my pending application Serial Number 93,851, filed March 7, 1961.

This invention is concerned with stabilization of the foam in fermented malt beverages such as beer, ale or the like. The term "beer" as used in this application also refers to other types of fermented malt beverages.

In my earlier parent application it was disclosed that traces of inorganic zinc ions added in part per million quantities greatly improved the amount, quality and the persistence of the foamy "head" on the fermented malt beverage after pouring.

It was further shown that zinc ions added as a solution of a soluble zinc salt such as zinc sulfate, chloride or acetate to beer, preferably after fermentation, not only greatly improved its foaminess and foaming qualities but also made the beer more nutritious. Beer is one foodstuff that is deficient in zinc content so that by adding the zinc ions as indicated in this application it brings the zinc content of beer up to the levels found in other foodstuffs.

The optimum levels of zinc ion additions described in my earlier application were from 5 parts per million to 25 parts per million as indicated in that application. Lower levels of addition such as 1 or 2 parts per million imparted some foam improvement while amounts over 25 parts per million gave added increases in the foaming effect. However, the optimum range gives the most noticeable improvement with an economy of material, the higher levels are not needed or recommended.

At this trace level of addition the zinc ions produce no change in flavor or taste for the vast majority of subjects tasting and drinking the beer. However, in extensive taste tests there is a small minority of subjects with an extremely sensitive palate for this particular type of flavor, and these people can discriminate and detect these trace levels of zinc additions. The taste is variously described as astringent or bitter. These people constitute only a very small fraction of our populations amounting to much less than 1 in 1,000. It is well known that individual sensitivities to different tastes vary enormously, some people are able to discriminate and detect, for instance, sweetness or acid at levels which are below threshold levels to the majority of the population. It is to these people with extremely sensitive taste buds for astringency and bitterness that this invention is directed.

This invention is concerned with an improvement in these formulations for enhancing the foam in beer such that the zinc additions cannot be detected by taste by these ultra-sensitive individuals.

I have found that the addition of chelating agents such as glycine, the salts of ethylene diamine tetraacetic acid (EDTA), N-hydroxy ethyl ethylene diamine triacetic acid, cyclohexane 1,2-diamino tetraacetic acid, diethylene triamine pentaacetic acid, sodium glutamate, and hydroxy acids such as lactic, tartaric, citric, malic or gluconic acid in part per million quantities prevents these individuals with super-sensitive tastes from discerning or detecting the taste of the zinc ions.

Surprisingly, this chelation of the zinc ions to obscure their taste has no effect on the zinc ion's ability to improve the foaminess of the beer. It is theorized that the zinc chelates formed at the pH of beer have certain stabilities and that these stabilities are such that they enclose and protect the zinc ions from acting on the taste buds of the mouth but are of insufficient stability to prevent their interaction with the proteins or other surface active constituents of beer when the foam is produced.

The demonstration that chelation of the zinc in beer has substantially no effect on its enhancement of foaming is easily made. A foam test in use by the industry may be utilized. In this test a series of uniform glasses are used. Immediately before pouring the beer the glass is filled with a fresh 2% solution of milk in water. The milk is poured out and the glass allowed to drain for a few seconds. The beer at 20° C. is poured into the glass from a height of 2 inches above the top edge of the glass until the foam rises to the top edge. A stopwatch is started at this point when the glass is full and the time it takes for the foam to collapse is noted. Rinsing the glass with the dilute milk solution prior to pouring the beer makes the foam collapse faster and more uniform and produces an easily discernible endpoint of foam collapse. The following tabulation of foam collapse times shows that (1) the addition of 5 or 10 parts per million of zinc significantly slows down the foam collapse rate producing a much more persistent foam and (2) that the addition of chelating agents has no deleterious effect on this foam improvement.

MILK POUR TEST 1

| Additive: | Increase in time of foam collapse (seconds) |
|---|---|
| Control | -- |
| 5 p.p.m. zinc | 29 |
| +5 p.p.m. EDTA* | 26 |
| +10 p.p.m. EDTA* | 32 |
| +20 p.p.m. EDTA* | 27 |
| 10 p.p.m. zinc | 56 |
| +5 p.p.m. EDTA* | 54 |
| +10 p.p.m. EDTA* | 55 |
| +20 p.p.m. EDTA* | 57 |

MILK POUR TEST II

| | |
|---|---|
| Control | -- |
| 5 p.p.m. zinc | 12 |
| +5 p.p.m. glycine | 11 |
| +10 p.p.m. glycine | 14 |
| +20 p.p.m. glycine | 24 |
| 10 p.p.m. zinc | 28 |
| +5 p.p.m. glycine | 30 |
| +10 p.p.m. glycine | 29 |
| +20 p.p.m. glycine | 33 |

* Added as the disodium calcium salt of EDTA.

An individual with "normal" taste cannot detect the addition of 5 or 10 parts per million of zinc ions to beer. An individual with the necessary super-sensitive taste buds can detect this addition. However, when these chelating agents are added in amounts of about 50% of the weight of the added zinc ions, the begin to lose their ability to detect this taste effect.

The following examples are given for the purpose of illustrating the practice of this invention and they are not to be construed as limiting the scope of this invention thereto. Many modifications may be made in the proportions and also in the selection of the chelating agents employed by those skilled in the art without departing from the breadth of the appended claims. For instance, the soluble zinc salt may be varied from 1% to about 70% of the mixture and the chelating agent may be varied from about 5% to 80% of the mixture. If a gummy material is used in the formulation it may be selected from the group comprising gum arabic, propylene glycol alginate, carboxymethyl cellulose or carboxymethylhydroxyethyl cellulose.

*Example I*

| | Percent |
|---|---|
| Zinc sulfate | 35 |
| Glycine | 65 |

One pound of this mixture is dissolved in about 1 gallon of water. This solution is sufficient to treat 100 barrels of beer in storage tanks. It is either added to the beer by a proportioning device which pumps it into the beer lines while the beer is being transferred from tank to tank, or it may be added to the empty tank before beer is pumped into it. At this level of addition 5 parts per million of zinc ions in the chelated form are added to the beer which produces a substantial improvement in foam effect and yet, the taste of the addition is imperceptible even to those individuals with the super-sensitive taste receptors for this type of taste.

*Example II*

|  | Percent |
|---|---|
| Gum arabic | 63.9 |
| Zinc sulfate | 17.4 |
| EDTA | 18.7 |

The EDTA used in this formulation is the disodium, calcium salt of ethylene diamine tetraacetic acid. This material is used similar to that described in Example I. When used at a level of 2 pounds per 100 barrels of beer it will add 5 parts per million of zinc ions to the beer in the chelated form. At this level of addition substantial improvement in foaming quality of the beverage will be obtained without imparting any detectable change in taste even to those individuals with an ultra-sensitive taste. At 4 pounds per 100 barrels the level of addition is equivalent to 10 parts per million of zinc ions in the chelated form. If less improvement in foaminess is desired for the particular batch of beer being treated, amounts below 2 pounds per 100 barrels may be employed, for instance, 1 pound per 100 barrels or even ½ pound.

*Example III*

|  | Percent |
|---|---|
| Gum arabic | 22 |
| Zinc sulfate | 17 |
| Gluconic acid | 31 |
| Disodium, calcium EDTA | 30 |

The ingredients are blended together in a dry mixer. In use it is dissolved in water or beer at approximately a 2% solution. When used at a rate of 2 pounds per 100 barrels of beer a zinc level of addition of 5 p.p.m. is obtained. This gives a substantial increase in the foaminess and foam stability of the beer without affecting the taste of the beverage. Further improvement in foam may be effected by using higher levels such as 4 pounds or more per hundred barrels of beer without risking detectable changes in flavor of the finished beer.

*Example IV*

|  | Percent |
|---|---|
| Gum arabic | 48 |
| Zinc sulfate | 35 |
| Glycine | 12 |
| Disodium, calcium EDTA | 5 |

This composition is prepared and used in a manner similar to that described for Example III. One pound of this material when used per 100 barrels provides a zinc ion level in the chelated form of 5 parts per million of zinc in the beer.

The embodiments of the invention in which an exclusive property or privilege is claimed are as follows:

In the method of improving the foam characteristics of malt beverages which comprises adding to said beverages a water soluble zinc compound, the improvement which comprises adding to said beverages a non-toxic chelating agent for zinc which eliminates the astringent taste due to the presence of zinc ions without adversely effecting the beneficial effects of the zinc ions on the foam characteristics of the malt beverages, said chelating agent being selected from the group consisting of glycine, the salts of ethylene diamine tetraacetic acid, N-hydroxyethyl ethylene diamine tetraacetic acid, cyclohexane, 1,2-diamino tetraacetic acid, diethylene triamine penta acetic acid, and sodium glutamate, and being added in an amount ranging from 5% to 80% of the combined weight of water soluble zinc compound and the chelating agent.

References Cited by the Examiner

UNITED STATES PATENTS

| 2,559,612 | 7/51 | Geller | 99—48 |
| 2,711,963 | 6/55 | Gray | 99—48 |
| 2,712,500 | 7/55 | Weaver et al. | 99—48 |
| 2,748,002 | 5/56 | Kneen | 99—48 |
| 2,838,399 | 6/58 | Vogel | 99—48 |
| 3,081,167 | 3/63 | Goulston et al. | |

OTHER REFERENCES

"Journal of Institute of Brewing," vol. 43, 1937, pp. 251–262; p. 258 relied on.

Moncrieff: "The Chemical Senses," 1944, Leonard Hill Ltd., London, 1944, p. 237.

Ault et al.: J. Institute of Brewing, vol. 58, 1952, pp. 136–139.

Martell et al.: "Chemistry of the Metal Chelate Compounds," Prentice-Hall, Inc., Englewood Cliffs, N.J., 1956, p.478. QD 411 M38

A. LOUIS MONACELL, *Primary Examiner.*

ABRAHAM H. WINKELSTEIN, *Examiner.*